United States Patent
Kobayashi

(10) Patent No.: US 8,260,233 B2
(45) Date of Patent: Sep. 4, 2012

(54) FM RECEIVER

(75) Inventor: Keiji Kobayashi, Kawanishi (JP)

(73) Assignees: Sanyo Electric Co., Ltd., Moriguchi-shi (JP); Sanyo Semiconductor Co., Ltd., Ora-gun (JP)

( * ) Notice: Subject to any disclaimer, the term of this patent is extended or adjusted under 35 U.S.C. 154(b) by 813 days.

(21) Appl. No.: 12/289,142

(22) Filed: Oct. 21, 2008

(65) Prior Publication Data

US 2009/0111410 A1    Apr. 30, 2009

(30) Foreign Application Priority Data

Oct. 24, 2007  (JP) ................. 2007-276425

(51) Int. Cl.
*H04Q 9/00* (2006.01)
(52) U.S. Cl. ................. 455/214; 455/266; 455/63.1
(58) Field of Classification Search ............ 455/214, 455/266, 63.1
See application file for complete search history.

(56) References Cited

U.S. PATENT DOCUMENTS

| | | | | |
|---|---|---|---|---|
| 4,563,651 A | * | 1/1986 | Ohta et al. ............... | 329/318 |
| 5,125,105 A | * | 6/1992 | Kennedy et al. ........... | 455/164.1 |
| 5,317,217 A | * | 5/1994 | Rieger et al. .............. | 327/555 |
| 6,173,166 B1 | * | 1/2001 | Whitecar .................. | 455/296 |

FOREIGN PATENT DOCUMENTS

| | | |
|---|---|---|
| EP | 1 865 607 A1 | 12/2007 |
| JP | A-2004-312077 | 11/2004 |
| WO | WO 00/77939 A1 | 12/2000 |
| WO | WO 2006/106788 A1 | 10/2006 |

OTHER PUBLICATIONS

European Search Report dated Jun. 7, 2011 in European Application No. 08018578.8.

* cited by examiner

*Primary Examiner* — Edward Urban
*Assistant Examiner* — Stacey Sorawat
(74) *Attorney, Agent, or Firm* — Oliff & Berridge, PLC

(57) ABSTRACT

The IFBPF (80) can variably set a passband width ($W_F$) and an attenuation slope ($K_F$). The bandwidth control circuit (102), which is constituted in hardware, controls the $W_F$ in accordance with the receiving state, which is composed of a combination of the receiving electric field intensity, the modulation degree, and the intensity of the adjacent-channel interference. A microcomputer (54) controls the $K_F$ on the basis of a program stored in a nonvolatile memory (60) and finely adjusts the effective passband width. Control of the $W_F$ contradictory for prevention of audio distortion and control of adjacent-channel interference is required when high modulation and adjacent-channel interference exist in a weak electric field state, and the setting becomes difficult. In this particular case, a configuration in which the $K_F$ can be modified by a program allows an advantageous receiving state to be readily obtained.

3 Claims, 3 Drawing Sheets

FIG.2A (WEAK ELECTRIC FIELD STATE)

|  | ADJACENT-CHANNEL INTERFERENCE STATE | NON-ADJACENT-CHANNEL INTERFERENCE STATE |
|---|---|---|
| HIGH MODULATION DEGREE STATE | $W_F = w_{N1}$<br>$K_F = k_H$ OR $k_L$ | $W_F = w_W$<br>$K_F = k_L$ |
| LOW MODULATION DEGREE STATE | $W_F = w_{N2}$<br>$K_F = k_H$ | $W_F = w_{N2}$<br>$K_F = k_H$ |

FIG.2B (A STATE OF AN INTERMEDIATE ELECTRIC FIELD OR HIGHER)

|  | ADJACENT-CHANNEL INTERFERENCE STATE | NON-ADJACENT-CHANNEL INTERFERENCE STATE |
|---|---|---|
| HIGH MODULATION DEGREE STATE | $W_F = w_{N1}$<br>$K_F = k_L$ | $W_F = w_W$<br>$K_F = k_L$ |
| LOW MODULATION DEGREE STATE | $W_F = w_{N1}$<br>$K_F = k_L$ | $W_F = w_W$<br>$K_F = k_L$ |

FM RECEIVER

CROSS-REFERENCE TO RELATED APPLICATION

The priority application number JP 2007-276425 upon which this patent application is based is hereby incorporated by reference.

BACKGROUND OF THE INVENTION

1. Field of the Invention

The present invention relates to an FM receiver for receiving frequency-modulated (Frequency Modulation: FM) signals.

2. Description of the Related Art

An FM signal requires a wider frequency band than, e.g., an AM signal in order to be transmitted because the frequency of the carrier wave is varied based on the audio signal or the like. For this reason, an FM receiver is susceptible to interference (adjacent-channel interference) from other signals transmitted at a frequency adjacent to the frequency of the target signal when the target transmission signal is received. This exerts a negative effect on the quality of a detected audio signal. Adjacent-channel interference can be reduced by narrowing the band of a band pass filter (BPF) for extracting a receiving target signal (desired wave).

FIG. 3 is a block diagram for describing the configuration of a conventional FM receiver. The RF (Radio Frequency) signal received by an antenna is converted to an intermediate signal having a predetermined intermediate frequency (IF) $f_{IF}$ and inputted to an IFBPF2. The IFBPF2 is a band-pass filter whose center frequency is $f_{IF}$, and the passband width $W_F$ is variable within a range of, e.g., about 40 kHz to about 220 kHz.

The FM signal that has passed through the IFBPF2 is fed to a limiter amplifier 4. The limiter amplifier 4 amplifies the FM signal to form a rectangular wave, and removes noise carried on the FM signal. The FM signal thus amplified and formed into a rectangular wave by the limiter amplifier 4 is inputted to an FM detection circuit 6. The FM detection circuit 6 detects a modulating signal in the output signal of the limiter amplifier 4.

An audio signal is reproduced based on the FM detection output. The FM detection output $S_{DET}$ is inputted to an adjacent-channel interference detection circuit 8 and a modulation degree detection circuit 10. The adjacent-channel interference detection circuit 8 extracts from the $S_{DET}$ the high band component that can be produced by adjacent-channel interference, and generates a DC signal $S_{AI}$ having a voltage level that corresponds to the strength of the high band component. The modulation degree detection circuit 10 generates a DC signal $S_{MD}$ having a voltage level that corresponds to the modulation degree of the received signal on the basis of the $S_{DET}$.

The limiter amplifier 4 is also connected to a signal meter (S meter) circuit 12. The limiter amplifier 4 is composed of a circuit that connects several stages of buffer amplifiers in series. The S meter circuit 12 uses the output of each buffer amplifier of the limiter amplifier 4 as input signals and generates a received electric field intensity signal $S_{FI}$ that corresponds to the signal intensity of the FM signal on the basis of the input signals.

A bandwidth control circuit 14 receives as input the output $S_{AI}$ of the adjacent-channel interference detection circuit 8, the output $S_{MD}$ of the modulation degree detection circuit 10, and the output $S_{FI}$ of the S meter circuit 12, and controls the passband width $W_F$ of the IFBPF2. The bandwidth control circuit 14 works to narrow the passband width $W_F$ as the level of the output signal $S_{AI}$ of the adjacent-channel interference detection circuit 8 becomes higher. An FM signal from which adjacent-channel interference waves have been removed is inputted to the FM detection circuit 6, and degradation of the audio quality due to adjacent-channel interference can be reduced and controlled.

The bandwidth control circuit 14 works to narrow the passband width $W_F$ even when the received electric field intensity is in a predetermined weak electric field state. The weak electric field noise component that passes through the IFBPF2 can be reduced and sensitivity can be improved.

On the other hand, it is possible that audio distortion will occur when the passband width $W_F$ is narrowed in a high modulation state. In view of this possibility, the bandwidth control circuit 14 sets the passband width $W_F$ to a reference bandwidth even when the electric field is in a weak state in the case that adjacent-channel interference has not occurred and the modulation degree is high, and gives priority to voice distortion control over removal of weak electric field noise.

Control of the passband width $W_F$ for obtaining an advantageous audio quality is contradictory for the case of a weak electric field and the case of a high modulation degree. Accordingly, the $W_F$ is set to terms of a trade off between reduction of weak electric field noise and control of audio distortion, and an advantageous setting is difficult to obtain. The intensity of the adjacent-channel interference is also related to the setting of the $W_F$, as described above, and, for example, it is not necessarily the case that, in a state of adjacent-channel interference, the adjacent-channel interference is removed in an advantageous manner by using the $W_F$, even though the $W_F$ has been successfully set in an advantageous manner in the case of a weak electric field and high modulation without adjacent-channel interference. On the other hand, it is not easy to adjust the $W_F$ to an advantageous value with respect to the stated conditions, and the configuration of the bandwidth control circuit 14 becomes complex when an attempt is made to do so in a conventional bandwidth control circuit 14 using hardware. In other words, it is conventionally difficult to set the $W_F$ so that noise, audio distortion, and adjacent-channel interference are sufficiently controlled in various states of received electric field intensity, modulation degree, and intensity of the adjacent-channel interference. There is a problem in that the $W_F$ can only be set so that all of the characteristics are passably satisfied.

SUMMARY OF THE INVENTION

The present invention was contrived in order to solve the above-described problems, and an object of the present invention is to provide an FM receiver that allows good audio quality to be readily obtained.

The FM receiver according to the present invention comprises an intermediate signal generation circuit for generating an intermediate signal, a received signal being subjected to frequency conversion for shifting a carrier frequency of an FM signal intended to receive to a predetermined intermediate frequency; a band pass filter for passing the FM signal intended to receive converted to the intermediate signal, a predetermined pass characteristic parameters including a passband width being variably settable; a received intensity detection circuit for detecting a received electric field intensity on the basis of the intermediate signal; a modulation degree detection circuit for detecting a modulation degree of the FM signal intended to receive; an adjacent-channel interference detection circuit for detecting interference of an adjacent signal on the FM signal intended to receive; a bandwidth control circuit for setting the passband width to a basic bandwidth in accordance with an interested reception condition, a predetermined control being carried out in accordance with the interested reception condition composed of a combination of the received electric field intensity, the modulation degree, and the adjacent signal interference intensity; a storage part for storing a control program in which is stored a control procedure for controlling the pass characteristics parameter in accordance with the interference intensity and the modulation degree; and a microcomputer executing the control program and controlling an auxiliary passband width, which is the width of an auxiliary passband width added to the two sides of the passband set in the bandwidth control circuit.

BRIEF DESCRIPTION OF THE DRAWINGS

FIGS. 2A and 2B are tables for describing the basic control operation related to the passband width $W_F$ and the attenuation slope $K_F$.

DESCRIPTION OF THE PREFERRED EMBODIMENTS

In accordance with the present invention, the passband width $W_F$ is adjusted by a microcomputer on the basis of a control program using a basic bandwidth as a base set by a bandwidth control circuit that can be composed of hardware. The adjustment is carried out by adding an auxiliary passband to the basic bandwidth set by the bandwidth control circuit. In this case, the passband width of the band pass filter refers to the width between the cutoff frequency of the low pass side and the high pass side, which is ordinarily −3 dB with respect to the gain of the passband, and this is referred to as a narrowly defined passband width. In contrast, the combined bands composed of the passband and the transition band that exists between the passband and the attenuation band and through which signal energy can partially pass will be referred to as a widely defined passband width. In the present invention, the addition of an auxiliary passband by a microcomputer may be one for varying the narrowly defined passband width, or may be one for adjusting the width of the passband and the width of the transition band to vary the widely defined passband width. The width of the transition band can be adjusted using the attenuation slope.

Figure 1:
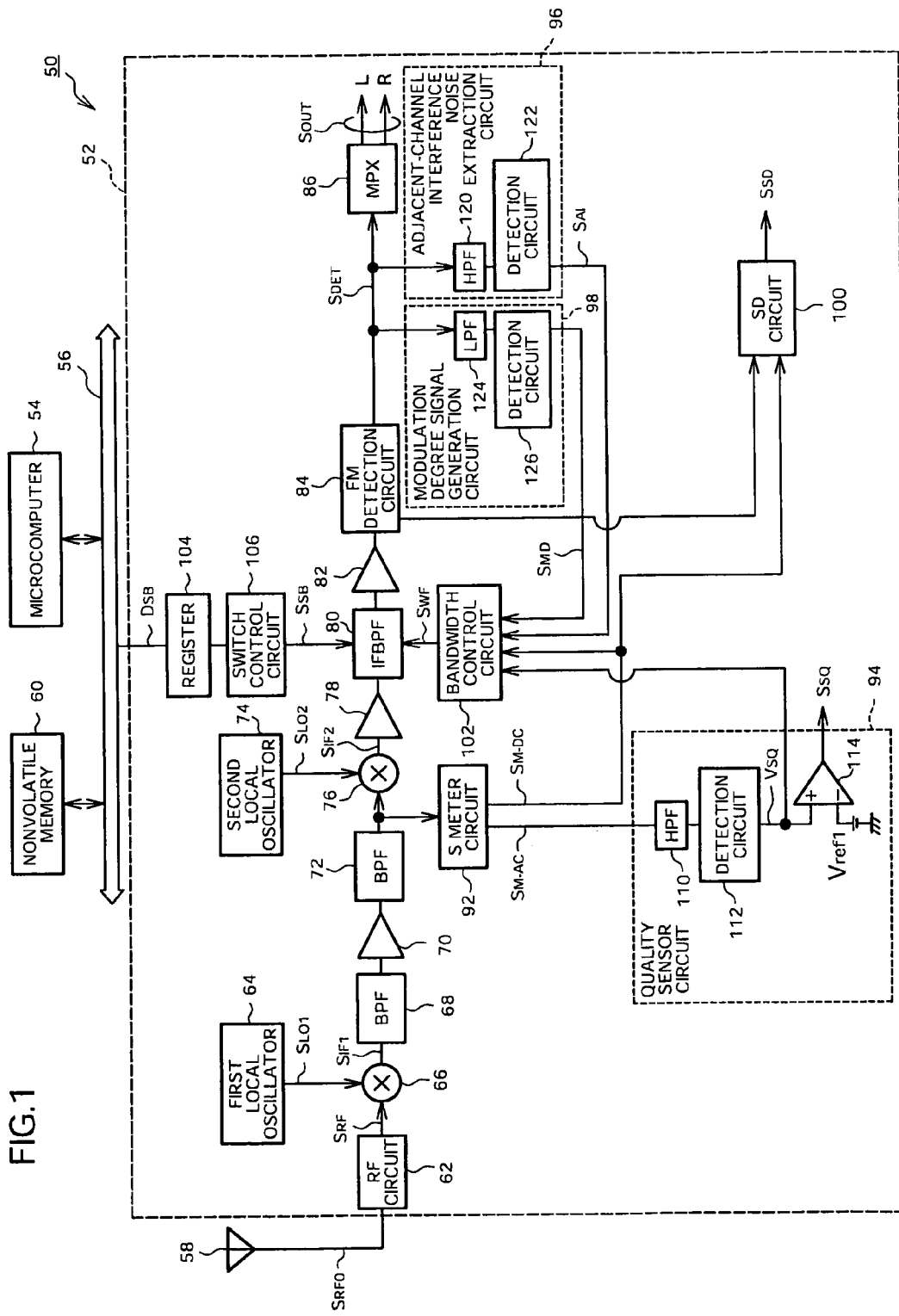
FIG. 1 is a schematic block diagram of an FM radio receiver according to the embodiments of the present invention.
Figure 3:
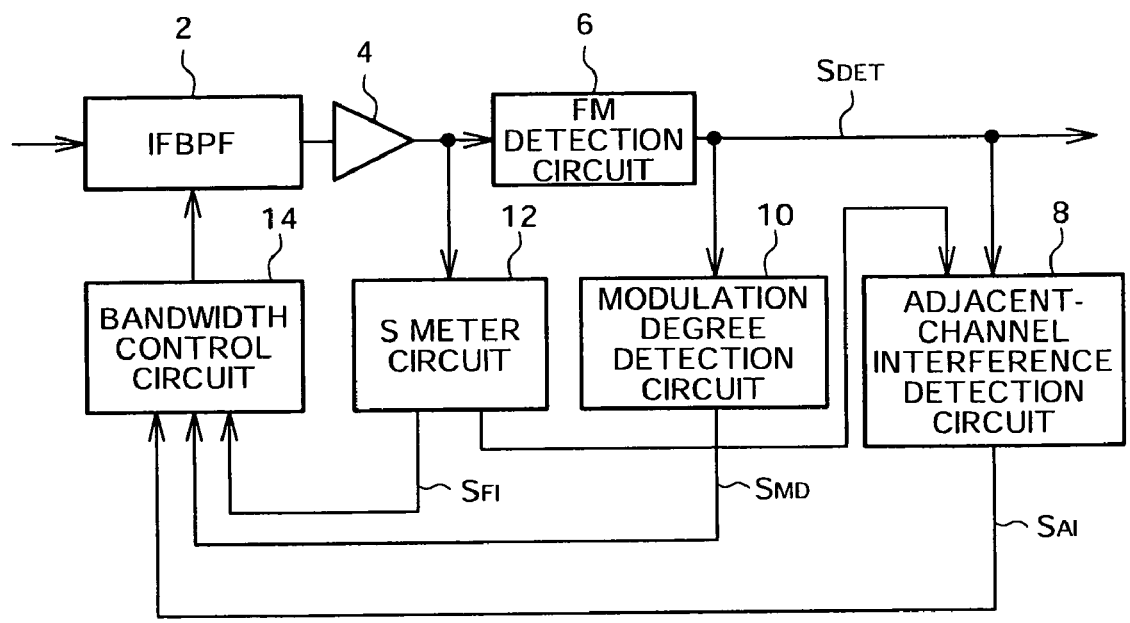
FIG. 3 is a block diagram for describing the configuration of a conventional FM receiver.

Embodiments of the present invention (hereinbelow referred as embodiments) are described below with reference to the diagrams. The present embodiment implements the present invention by adjusting the width of the transition band by using the attenuation slope. FIG. 1 is a schematic block diagram of an FM radio receiver 50 according to the embodiments. The FM radio receiver 50 has an FM tuner circuit 52, a microcomputer 54 as a controller for controlling the operation of the FM tuner circuit 52, and a system bus 56 for enabling communication between the FM tuner circuit and the microcomputer. The main part of the FM tuner circuit 52 is an integrated circuit. For example, a single chip or single package 1C, or a plurality of chip IC can be configured to include a signal processing circuit for generating an output signal $S_{OUT}$ that corresponds to the audio signal of a desired station from an RF signal $S_{RF0}$ received by an antenna 58, and a nonvolatile memory 60 composed of an EEPROM or the like and in which data or the like used in the operation of the signal processing circuit is stored.

The RF signal $S_{RF0}$ received by the antenna 58 is processed in a signal processing system having an RF circuit 62, a first local oscillator 64, a first mixing circuit 66, BPFs 68, 72, a buffer amplifier 70, 78, second local oscillators 74, a second mixing circuit 76, an IFBPF 80, a limiter amplifier 82, an FM detection circuit 84, and a matrix circuit (MPX circuit) 86. The signal processing system generates an output signal $S_{OUT}$.

In addition to the constituent elements described above, the FM tuner circuit 52 has an S meter circuit 92, a quality sensor circuit 94, an adjacent-channel interference noise extraction circuit 96, a modulation degree signal generation circuit 98, an SD (Station Detection) circuit 100, a bandwidth control circuit 102, a register 104, and a switch control circuit 106.

The RF signal $S_{RF0}$ is inputted to the RF circuit 62. The RF circuit 62 is tuned in order to extract the RF signal $S_{RF}$ of a relatively narrow band that includes the target receiving station having a carrier wave frequency $f_R$, from the RF signal $S_{RF0}$ across the receiving objective band. The RF signal $S_{RF}$ extracted by the RF circuit 62 is inputted to the first mixing circuit 66.

The first local oscillator 64 has a divider circuit and an oscillation circuit that uses a PLL (Phase Locked Loop) circuit, and provides a first local oscillation signal $S_{LO1}$ as output. The frequency $f_{LO1}$ of the $S_{LO1}$ is determined by the oscillation frequency of the oscillation circuit and the division ratio of the divider circuit in the first local oscillator 64.

The first mixing circuit 66 mixes the inputted RF signal $S_{RF}$ with the first local oscillation signal $S_{LO1}$ inputted from the first local oscillator 64 and generates a first intermediate signal $S_{IF1}$. The frequency $f_{LO1}$ of the $S_{LO1}$ is adjusted so that a carrier wave frequency $f_R$ of the signal of the target receiving station included in the $S_{RF}$ is converted to a predetermined first intermediate frequency $f_{IF1}$ in the conversion from $S_{RF}$ to $S_{IF1}$ carried out by the first mixing circuit 66. The oscillation frequency of the oscillation circuit and the division ratio of the divider circuit in the first local oscillator 64 can be controlled based on a data set in an undepicted register. The microcomputer 54 carries out the adjustment of the frequency $f_{LO1}$ by setting the data in the register. The first intermediate frequency $f_{IF1}$ is set to, e.g., 10.7 MHz.

The $S_{IF1}$ outputted from the first mixing circuit 66 is inputted to the second mixing circuit 76 via a BPF 68, a buffer amplifier 70, and a BPF 72. For example, the BPFs 68, 72 can be configured using a ceramic filter.

The second mixing circuit 76 mixes the inputted first intermediate signal $S_{IF1}$ with a second local oscillation signal $S_{LO2}$ inputted from the second local oscillator 74, and generates a second intermediate signal $S_{IF2}$ having a second intermediate frequency $f_{IF2}$. The frequency $f_{LO2}$ of the $S_{LO2}$ is set to ($f_{IF1}$−$f_{IF2}$), and the target receiving signal of the frequency $f_{IF1}$ included in the $S_{IF1}$ is converted to a frequency $f_{IF2}$ in the second mixing circuit 76. The second intermediate frequency $f_{IF2}$ is set to, e.g., 450 kHz.

The $S_{IF2}$ is inputted to the IFBPF 80 by way of the buffer amplifier 78. The IFBPF 80 is a band pass filter whose center frequency is the $f_{IF2}$ and that can variably set the pass characteristics parameter including the passband width $W_F$ and the attenuation slope $K_F$. The passband width $W_F$ of the IFBPF 80 is essentially controlled by the bandwidth control circuit 102. The attenuation slope $K_F$ is changed by providing multiple steps of a BPF to the IFBPF 80 and switching the number of connection steps, and is controlled by varying the circuit constant of the BPF with the aid of a control voltage. For example, a switch control circuit 106 that controls a switch for switching the number of connection steps of BPF is shown in FIG. 1 as an example of a circuit for controlling the attenuation slope $K_F$. Control of the pass characteristics parameter of the IFBPF 80 will be described in greater detail.

The $S_{IF2}$ outputted from the IFBPF 80 is inputted to the FM detection circuit 84 by way of the limiter amplifier 82. The FM detection circuit 84 is constituted using, e.g., a quadrature detection circuit. The FM detection circuit 84 detects a modulating signal in the $S_{IF2}$ inputted from the limiter amplifier 82, and outputs a detection output signal $S_{DET}$.

The matrix circuit 86 extracts an (L+R) signal and an (L−R) signal from the $S_{DET}$, which is a stereo composite signal, during stereo broadcast, and separates the L signal and the R signal from the (L+R) signal and the (L−R) signal.

The S meter circuit 92 generates a fluctuation component signal $S_{M-AC}$ included in the $S_{IF1}$ on the basis of the $S_{IF1}$ inputted from the BPF 72, for example, and the fluctuation component is smoothed using a low pass filter (LPF) to generate a receiving electric field intensity signal $S_{M-DC}$. The $S_{M-AC}$ is used in the quality sensor circuit 94. On the other hand, the $S_{M-DC}$ is used in the SD circuit 100 and the bandwidth control circuit 102.

The quality sensor circuit 94 is a circuit for detecting the existence of adjacent-channel interference and multipath interference on the basis of the $S_{M-AC}$, and has a high pass filter (High Pass Filter: HPF) 110, a detection circuit 112, and a comparator 114. The HPF 110 can switch the cutoff frequency $f_C$ in accordance with whether the component of a frequency band that corresponds to the adjacent-channel interference is to be extracted from the $S_{M-AC}$ or whether the component of the frequency band that corresponds to the multipath interference is to be extracted. As for adjacent-channel interference, the frequency of the high-frequency component appears in accordance with Δf in the $S_{M-AC}$ when adjacent-channel interference occurs, wherein Δf is the difference in the RF frequency between the desired station and the broadcast station that is generating the adjacent-channel interference. For example, the cutoff frequency $f_C$ of the HPF 110 when the component that corresponds to the adjacent-channel interference is extracted from the $S_{M-AC}$ can be set to, e.g., about 100 kHz, because the channel step of FM broadcasting in Japan is 100 kHz as well as due to other factors. The $f_C$ when the component that corresponds to multipath interference is extracted from the $S_{M-AC}$ can be set to about 50 kHz because the high frequency component ordinarily brought about by multipath interference has a frequency that does not reach as high as the component produced by adjacent-channel interference. The detection circuit 112 rectifies and detects the high-frequency component passed through the HPF 110, and generates a DC signal $V_{SQ}$ having a voltage level that corresponds to the adjacent-channel interference noise component amount or the multipath noise amount in the received signal. In this case, the $V_{SQ}$ is used for automatic variable control of the passband width $W_F$ of the IFBPF 80 in the bandwidth control circuit 102 as described below.

The comparator 114 compares the output level $V_{SQ}$ of the detection circuit 112 and the reference voltage $V_{ref1}$ set to a predetermined threshold value. For example, when $V_{SQ} > V_{ref1}$, the comparator 114 outputs a high (H) level as an SQ sensor signal $S_{SQ}$ indicating that adjacent-channel interference or multipath interference is being generated. Conversely, when $V_{SQ} \leq V_{ref1}$, the comparator 114 outputs a low (L) level as the $S_{SQ}$ indicating that neither adjacent-channel interference nor multipath interference is being generated. The $S_{SQ}$ is inputted to the microcomputer 54.

The adjacent-channel interference noise extraction circuit 96 extracts the adjacent-channel interference noise component included in the output signal $S_{DET}$ of the FM detection circuit 84. The $S_{DET}$ when adjacent-channel interference is generated is superimposed on the signal component of the audio band that corresponds to the desired station, and has a high-frequency component having a frequency that corresponds to the RF frequency difference Δf between the desired station and the interference station. The adjacent-channel interference noise extraction circuit 96 has a HPF 120 and a detection circuit 122, and outputs a DC signal $S_{AI}$ having a voltage level that corresponds to the strength of the high band component that can be produced by adjacent-channel interference. The cutoff frequency $f_C$ of the HPF 120 is set so that the main component of the adjacent-channel interference noise contained in the $S_{DET}$ passes through the HPF 120. The cutoff frequency $f_C$ of the HPF 120 can be set to, e.g., about 100 kHz in the same manner as the HPF 110 described above. The $S_{AI}$ is inputted to the bandwidth control circuit 102.

The modulation degree signal generation circuit 98 generates a DC signal $S_{MD}$ having a voltage level that corresponds to the modulation degree of the receiving signal on the basis of the $S_{DET}$. The modulation degree signal generation circuit 98 has an LPF 124 and a detection circuit 126, removes the high band component produced by adjacent-channel interference or the like, and outputs a DC signal $S_{MD}$ having a voltage level that corresponds to the modulation degree. The $S_{MD}$ is used in the bandwidth control circuit 102.

The SD circuit 100 outputs an SD signal $S_{SD}$ that shows whether the receiving station has been detected or not at the tuned frequency that has been set. The SD circuit 100 determines whether the receiving electric field intensity signal $S_{M-DC}$ from the S meter circuit 92 has exceeded a predetermined threshold value. The SD circuit 100 determines whether the band of the receiving station is present in the target range (SD range) on the basis of an f-V conversion characteristic referred to as an S curve between the frequency f of the intermediate signal $S_{IF2}$ and the voltage V of the detection output $S_{DET}$. The SD circuit 100 determines that the receiving station has been detected when a receiving signal having a predetermined intensity is obtained in the SD range. It can be ascertained from the output $S_{SD}$ of the SD circuit 100 whether the receiving electric field intensity has exceeded a predetermined value. The width of the SD range can be changed and it can be determined from the station detection state at each width whether the detected station is the desired station or adjacent station. The SD circuit 100 can also be used as means for detecting the presence of adjacent-channel interference.

The bandwidth control circuit 102 ascertains the receiving state on the basis of the $V_{SQ}$ obtained from the quality sensor circuit 94 or the $S_{AI}$ generated by the adjacent-channel interference noise extraction circuit 96, the $S_{MD}$ from the modulation degree signal generation circuit 98, and the $S_{M-DC}$ generated by the S meter circuit 92. The receiving electric field intensity and the existence of the adjacent-channel interference among the receiving states can be ascertained from the output $S_{SD}$ of the SD circuit 100. The bandwidth control circuit 102 generates a control voltage essentially set in advance by the circuit configuration in accordance with the combination of the receiving electric field intensity, the modulation degree, and the intensity of the adjacent-channel interference. The bandwidth control circuit 102 controls the $W_F$ of the IFBPF 80 with the aid of the control voltage signal $S_{WF}$.

Specifically, the bandwidth control circuit 102 narrows the passband width $W_F$ as the $V_{SQ}$ or the signal level of the $S_{AI}$ increases. An FM signal from which adjacent-channel interference waves have been removed is thereby inputted to the FM detection circuit 84, and degradation of audio quality due to adjacent-channel interference can be reduced and controlled. When the $V_{SQ}$ or the $S_{AI}$ is compared with a predetermined threshold value and the $V_{SQ}$ or the $S_{AI}$ is greater than the threshold value, it is determined that an adjacent-channel interference state (a state in which interference exists) exists and the $W_F$ can be narrowed. Conversely, if the $V_{SQ}$ or the $S_{AI}$ is less than the threshold value, it is determined that a non-adjacent-channel interference state (a state in which interference does not exist) exists and the $W_F$ can be widened.

The bandwidth control circuit 102 determines whether the modulation degree is a predetermined high modulation state or not on the basis of the $S_{MD}$. When the $S_{MD}$ is greater than a predetermined threshold value, it is determined that a high modulation state exists, and conversely when the $S_{MD}$ is the threshold value or less, it is determined that a low modulation state exists.

The bandwidth control circuit 102 determines whether the receiving electric field intensity is a predetermined weak electric field state or not on the basis of the $S_{M\text{-}DC}$. A weak electric field state is determined to be present when the $S_{M\text{-}DC}$ is lower than a threshold value, and is determined to be an intermediate electric field state or higher when the $S_{M\text{-}DC}$ is at a threshold level or higher.

The register 104 is connected to the system bus 56. The register 104 is set by the microcomputer 54 via the system bus 56 in relation to control data $D_{SB}$ for providing auxiliary control related to the passband of the IFBPF 80. The setting of the control data $D_{SB}$ in relation to register 104 will be described below.

The switch control circuit 106 controls a switch in the IFBPF 80 on the basis of the data $D_{SB}$ stored in the register 104, and changes the number of connection steps of the BPF constituting the IFBPF 80.

The microcomputer 54 acquires information related the receiving state from the quality sensor circuit 94, the adjacent-channel interference noise extraction circuit 96, the modulation degree signal generation circuit 98, and various other sensor circuits via the system bus 56 and communication means based on I²C (Inter-Integrated Circuit) protocol, and controls the operation of each part inside the FM tuner circuit 52 via the system bus 56, for example.

The nonvolatile memory 60 is connected to the system bus 56. The nonvolatile memory 60 is composed of, e.g., an EEPROM (Electronically Erasable and Programmable Read Only Memory). The storage content of the nonvolatile memory 60 can be rewritten by signals provided from the exterior. The written data is read by the microcomputer 54.

The microcomputer 54 operates based on a program, and the program is stored in the nonvolatile memory 60. The nonvolatile memory 60 stores various operation control programs for controlling the operation of the FM tuner circuit 52, and the microcomputer 54 suitably reads and executes the programs. In the present embodiment in particular, the microcomputer 54 rewrites the data $D_{SB}$ of the register 104 in accordance with the receiving state of the FM tuner circuit 52 in accordance with the program stored in the nonvolatile memory 60, and thereby controls, e.g., the attenuation slope $K_F$ of the IFBPF 80. This point will be further described below.

Next, the operation for controlling the passband width $W_F$ and the attenuation slope $K_F$ will be described using the bandwidth control circuit 102 and the microcomputer 54. FIGS. 2A and 2B are tables for describing the basic control operation of $W_F$ and $K_F$. The diagrams show the $W_F$ and the $K_F$ in each combination (condition classification) of the existence of adjacent-channel interference, the modulation degree, and the receiving electric field intensity. In this case, the control of the $W_F$ described below in relation to the adjacent-channel interference can be carried out by the bandwidth control circuit 102 so as to continuously vary the $W_F$ in accordance with the signal level of the $S_{AI}$. For the sake of convenience in FIGS. 2A and 2B, two states are classified, i.e., an adjacent-channel interference state and non-adjacent-channel interference state that correspond to whether the $S_{AI}$ is greater than a predetermined threshold.

FIG. 2A shows in table format the condition classification group of the weak electric field state, and FIG. 2B shows in table format the condition classification group of an intermediate electric field or higher. Each of FIGS. 2A and 2B has four cells formed by two rows and two columns that correspond to a combination of the level of the modulation degree and the existence or not of adjacent-channel interference.

Shown in each cell is the defined value of the passband width $W_F$ essentially controlled by the bandwidth control circuit 102, and the defined value of the attenuation slope $K_F$ controlled by the microcomputer 54 via the switch control circuit 106. The value $w_W$ of the $W_F$ represents the normal bandwidth, and $w_{N1}$ and $w_{N2}$ represent narrow bandwidths that are narrower than the normal bandwidth $w_W$. The normal bandwidth $w_W$ is essentially a large bandwidth in which audio distortion is less liable to occur even when the receiving signal has a high modulation degree, and the narrow bandwidths $w_{N1}$ and $w_{N2}$ are widths in which the effect of adjacent-channel interference removal can be expected. Also, $k_L$ is the normal value of the attenuation slope $K_F$, and $k_H$ is a strong attenuation slope in which $k_H > k_L$. In other words, in a state in which $k_H$ is set as the attenuation slope $K_F$, the attenuation in the transition band is steeper than the state in which the normal attenuation slope $k_L$ is set, and the width of the transition band becomes narrow.

The bandwidth control circuit 102 is essentially configured to narrow the passband width $W_F$ to less than the normal bandwidth, i.e. $W_F = w_{N1}$, in order to reduce the effect of adjacent-channel interference in an adjacent-channel interference state, and to set the passband width $W_F$ to the normal bandwidth, i.e. $W_F = w_W$, from the viewpoint of avoiding audio distortion in a non-adjacent-channel interference state. In a weak electric field state, the passband width $W_F$ preferably narrows in order to reduce weak electric field noise and to assure an improvement in sensitivity. From this viewpoint, the bandwidth control circuit 102 sets $W_F$ to be $w_{N2}$ regardless of the existence of adjacent-channel interference, for example, in a low modulation degree state in which audio distortion is less likely to occur among the weak electric field states. In this case, the $w_{N2}$ is a value in which the effect of adjacent-channel interference removal can be expected in the manner described above, is a value in which the effect of weak electric field noise control can be expected, and is essentially set so that $w_{N2} \leq w_{N1}$.

The microcomputer 54 operates based on a program stored in the nonvolatile memory 60. Each of the classified conditions described above can be freely defined in that, e.g., $K_F$ can be set to $k_L$ or $k_H$ by rewriting the program. For example, the program for defining $K_F$ can be registered in the nonvolatile memory 60 and executed by the microcomputer 54 on the basis of the four condition classifications shown in FIG. 2A related to a weak electric field state in order to improve the receiving state while using the state brought about by the bandwidth control circuit 102 as a base. The four condition classifications shown in FIG. 2A are (1) the case in which there is a non-adjacent-channel interference state and a low modulation degree state, (2) the case in which there is a non-adjacent-channel interference state and a high modulation degree state, (3) the case in which there is an adjacent-channel interference state and a low modulation degree state, and (4) the case in which there is an adjacent-channel interference state and a high modulation degree state.

For example, in cases (1) and (3) described above, in other words, in a low modulation degree state, the setting is $K_F=k_H$. In the particular case (3), i.e., an adjacent-channel interference state and a low modulation degree state, a good effect of controlling adjacent-channel interference obtained in the narrow bandwidth $w_{N2}$ set by the bandwidth control circuit 102 is maintained.

On the other hand, in the case of (2) described above, i.e., in a non-adjacent-channel interference state and a high modulation degree state, the setting is $K_F=k_L$. An effect of controlling audio distortion obtained in the normal bandwidth $w_W$ set by the bandwidth control circuit 102 is maintained or reinforced.

In the case of (4) described above, i.e., in an adjacent-channel interference state and a high modulation degree state, $K_F$ is set to one of $k_H$ and $k_L$ as selected by, e.g., the manufacturer of the FM radio receiver 50. For example, the effect of audio distortion can increase in magnitude more than the effect of adjacent-channel interference when the modulation degree of the FM broadcast of the country in which the FM radio receiver 50 is used is considerable. Therefore, the manufacturer can select $k_L$ to increase the width of the transition band, and priority can be given to reducing audio distortion, and when the modulation degree in the usage area is conversely not so considerable, $k_H$ is selected to narrow the state of the transition band and priority can be given to reducing adjacent-channel interference. The manufacturer can select a $K_F$ which yields a desired sound quality or a good sound quality in terms of compatibility or the like with the later stage circuits of the FM tuner circuit 52.

The $K_F$ can be modified by changing the number of connected steps of the BPF constituting the IFBPF 80. Specifically, the width of the transition band is narrowed by increasing the number of steps of the BPF. Therefore, the switch control circuit 106 controls the configuration of the IFBPF 80 so as to increase the number of steps in a series connection of the BPF when the $K_F$ is increased, and controls the configuration so as to reduce the number of steps when the $K_F$ is conversely reduced.

In accordance with the present invention, the receiving state can be improved by changing the program stored in the nonvolatile memory 60, even when no changes are made to the configuration of the bandwidth control circuit 102, which is constituted in hardware and in which it is difficult to make subsequent changes. For example, one method for modifying the $K_F$ is to switch out the program stored in the nonvolatile memory 60. An example of another method is to adopt a structure in which parameters that are separately set in the nonvolatile memory 60 are read and the $K_F$ is switched in accordance with the parameters. In this case, $K_F$ can be modified by merely rewriting the parameters.

The microcomputer 54 can directly read and process from an I/O port binary sensor output having an H level or an L level such as the output $S_{SD}$ of the SD circuit 100 or the output $S_{SQ}$ of the quality sensor circuit 94, for example. On the other hand, the sensor output obtained in an analog signal such a $S_{M-DC}$, $S_{AI}$, and $S_{MD}$ can be converted to digital data by an A/D (Analog-to-Digital) converter (ADC), the digital data inputted to the microcomputer 54. The presence of a weak electric field state, the range of the modulation degree, and the existence of adjacent-channel interference can be determined by a threshold determination made in software in the microcomputer 54. The result of comparing an analog signal with the threshold in a comparator can be inputted to the microcomputer 54.

Control for switching the $W_F$ and $K_F$ can be configured so as to prevent the occurrence of frequent switching by making use of a time constant or hysteresis. In accordance with this configuration, it is possible to control phenomena that are unpleasant for the listener, including the occurrence of sound fluctuation, marked variations in sound quality, and the like.

In the embodiment described above, an FM radio receiver 50 was described in which an auxiliary passband is added to the basic bandwidth of the IFBPF 80 set by the bandwidth control circuit 102 by adjusting the width of the transition band with the aid of the attenuation slope. However, the addition of an auxiliary passband carried out by the microcomputer in relation to the present invention is not limited to the embodiment described above in which the width of the transition band is adjusted and the widely defined passband width is variable. In the present invention, the addition of an auxiliary passband carried out by the microcomputer as already described above may be one in which the narrowly defined passband width is varied, or may be one in which the widely defined passband width is varied by adjusting the width of the passband and the width of the transition band.

The adjustment of the narrowly defined or the widely defined passband width carried out by the microcomputer can be flexibly modified in accordance with the control program, and the degree of freedom is higher than adjusting the passband width in hardware using a bandwidth control circuit. Accordingly, reception that is more advantageous merely using a bandwidth control circuit can be easily achieved by using various combinations of the receiving electric field intensity, the modulation degree, and the interference intensity of an adjacent signal.

What is claimed is:

1. An FM receiver comprising:
   an intermediate signal generation circuit for generating an intermediate signal, a received signal being subjected to frequency conversion for shifting a carrier frequency of an FM signal intended to receive to a predetermined intermediate frequency;
   a band pass filter for passing the FM signal intended to receive converted to the intermediate signal, a predetermined pass characteristic parameters including a passband width and an attenuation slope being variably settable;
   a received intensity detection circuit for detecting a received electric field intensity based on the intermediate signal;
   a modulation degree detection circuit for detecting a modulation degree of the FM signal intended to receive;
   an adjacent-channel interference detection circuit for detecting an interference of an adjacent-channel signal on the FM signal intended to receive;
   a bandwidth control circuit for setting the passband width to a basic bandwidth in accordance with an interested reception condition, the bandwidth control circuit being a hard-wired circuit for performing a predetermined control being carried out with respect to the band pass filter in accordance with the interested reception condition composed of a combination of the received electric field intensity, the modulation degree, and an intensity of the interference of the adjacent-channel signal;
   a storage part for storing a control program in which is stored a control procedure for controlling the attenuation slope in accordance with the intensity and the modulation degree with respect to the band pass filter; and a microcomputer executing the control program and controlling the band pass filter to vary the width of a transition band in accordance with the attenuation slope.

2. The FM receiver of claim 1, wherein
when the received electric field intensity is in a predetermined weak electric field state, the control program sets a greater width for an auxiliary passband width in a case in which the interference intensity is in a noninterference state of less than a predetermined reference value, and the modulation degree is in a predetermined high modulation state, than in a case in which the interference intensity is in any state and the modulation degree is in a low modulation degree state of less than the high modulation state.

3. The FM receiver of claim 1, wherein
when the received electric field intensity is in a predetermined weak electric field state, the control program sets an auxiliary passband width, of a case in which a non-interference state exists in which the interference intensity is less than a predetermined reference value and the modulation degree is in a predetermined high modulation state, to be greater than a case in which the interference intensity is in any state and in a low modulation degree state in which the modulation degree is less than the high modulation state; and the control program is configured so as to be capable of selecting whether or not to set the auxiliary passband width, of a case in which an interference state exists in which the interference intensity is the reference value or greater and a high modulation state exists, to be greater than a case in which the interference intensity is in any state and in the low modulation degree state.

* * * * *